United States Patent [19]

Fennell

[11] Patent Number: 4,756,188
[45] Date of Patent: Jul. 12, 1988

[54] METHOD AND APPARATUS FOR COMPENSATING FOR DRILLING LINE STRETCH IN DETERMINING EQUIPMENT DEPTH IN A WELL AND FOR MEASUREMENT OF HOOKLOAD ON THE TRAVELING BLOCK OF A DRILLING RIG

[75] Inventor: Martin J. Fennell, Rancho Cordova, Calif.

[73] Assignee: Exploration Logging, Inc., Sacramento, Calif.

[21] Appl. No.: 880,583

[22] Filed: Jun. 30, 1986

[51] Int. Cl.⁴ .................................. E21B 47/02
[52] U.S. Cl. .................................. 73/151; 33/133; 73/158; 175/27; 254/272
[58] Field of Search .............. 73/151, 151.5, 158; 166/250, 64; 175/27, 40; 33/129, 133, 134 R, 134 A; 254/270, 272

[56] References Cited

U.S. PATENT DOCUMENTS

| | | | |
|---|---|---|---|
| 2,061,863 | 11/1936 | Wells | 73/158 |
| 3,115,036 | 12/1963 | Guthner | 73/151 |
| 3,552,025 | 1/1971 | Whitfill | 33/133 |
| 3,643,504 | 2/1972 | Rundell | 73/151.5 |
| 3,753,294 | 8/1973 | Ahali et al. | 33/133 |
| 3,777,560 | 12/1973 | Guignard | 73/151.5 |
| 3,891,038 | 6/1975 | Delestrade et al. | 73/151.5 X |
| 3,931,735 | 1/1976 | Guigmard | 73/151.5 |
| 4,338,565 | 7/1982 | Hall | 73/158 X |
| 4,434,971 | 3/1984 | Cordrey | 175/27 X |
| 4,562,743 | 1/1986 | Bonine | 73/158 |

Primary Examiner—Stewart J. Levy
Assistant Examiner—Kevin D. O'Shea
Attorney, Agent, or Firm—Christie, Parker & Hale

[57] ABSTRACT

An arrangement for measuring the stretch of a wire line used in well drilling operations by first measuring the amount of stretch in the deadline by measuring rotation of the dead sheave which supports the deadline, and multiplying the length of the wire line by the ratio of the amount of elastic stretch in the deadline to the length of the deadline. Equipment depth in the well is determined by measuring the movement of the wire line and applying a correction for the wire line stretch. If desired, a correction can also be applied for any errors in the split block separation. The ratio of the amount of stretch in the deadline to the length of the deadline may be employed to provide measurement of the hookload on the traveling block.

8 Claims, 6 Drawing Sheets

METHOD AND APPARATUS FOR COMPENSATING FOR DRILLING LINE STRETCH IN DETERMINING EQUIPMENT DEPTH IN A WELL AND FOR MEASUREMENT OF HOOKLOAD ON THE TRAVELING BLOCK OF A DRILLING RIG

BACKGROUND OF THE INVENTION

1. Field of the Invention

This invention relates to a method and apparatus for accurately determining equipment depth in a wall taking into consideration stretch of the wire line and errors in measurement of split block separation when a split block is used.

Measurement of the wire line stretch also provides an accurate way to determine the hookload on the traveling block of a drilling rig.

2. Prior Art

The accurate measurement of equipment depth in a well is of major importance.

Numerous ways have been developed for measuring equipment depth by measuring movement of the wire line. This measurement must be corrected to take into account the line stretch. Usually the line stretch is determined by measuring the hookload and deriving the line stretch from hookload and the modulus of elongation for the wire line.

However, it is difficult to measure the absolute value of the hookload. Hookload measurements are hard to verify and are usually assumed to be inaccurate. Calibration for a hookload measurement instrument cannot be achieved with accuracy.

Hence, corrections for line stretch based upon the measurement of hookload are inaccurate and that leads to inaccuracy in the measurement of equipment depth in a well.

SUMMARY OF THE INVENTION

The aforesaid disadvantages are overcome in the present invention by measurement of the line stretch in the deadline and projecting that measurement to the total wire line that is in use.

The value of the line stretch and the known modulus of elasticity for the line provide an accurate, verifiable measure of the hookload.

Use of the line stretch correction in conjunction with the measurement of the movement of the wire line which is disclosed in our U.S. Pat. No. 4,338,565 provides a measurement of equipment depth which is quite accurate. For example an accuracy of plus or minus 2 ft. can be expected as a well depth of 10,000 ft., with repeatability at plus or minus 0.5 ft.

The method and apparatus of the present invention may also, for offshore floating rigs, incorporate a correction for errors in the split block separation. Although the split block separation changes in accordance with changes in the rig position due to wave action, some inaccuracies arise which can be corrected by the present invention.

BRIEF DESCRIPTION OF THE DRAWINGS

FIG. 2 is a plan view of the crown block of the drilling rig;

FIG. 3 illustrates how measurement of the line stretch in the deadline is achieved by an encoder that engages the dead sheave of the crown block;

DETAILED DESCRIPTION OF THE PREFERRED EMBODIMENTS

Figure 1:
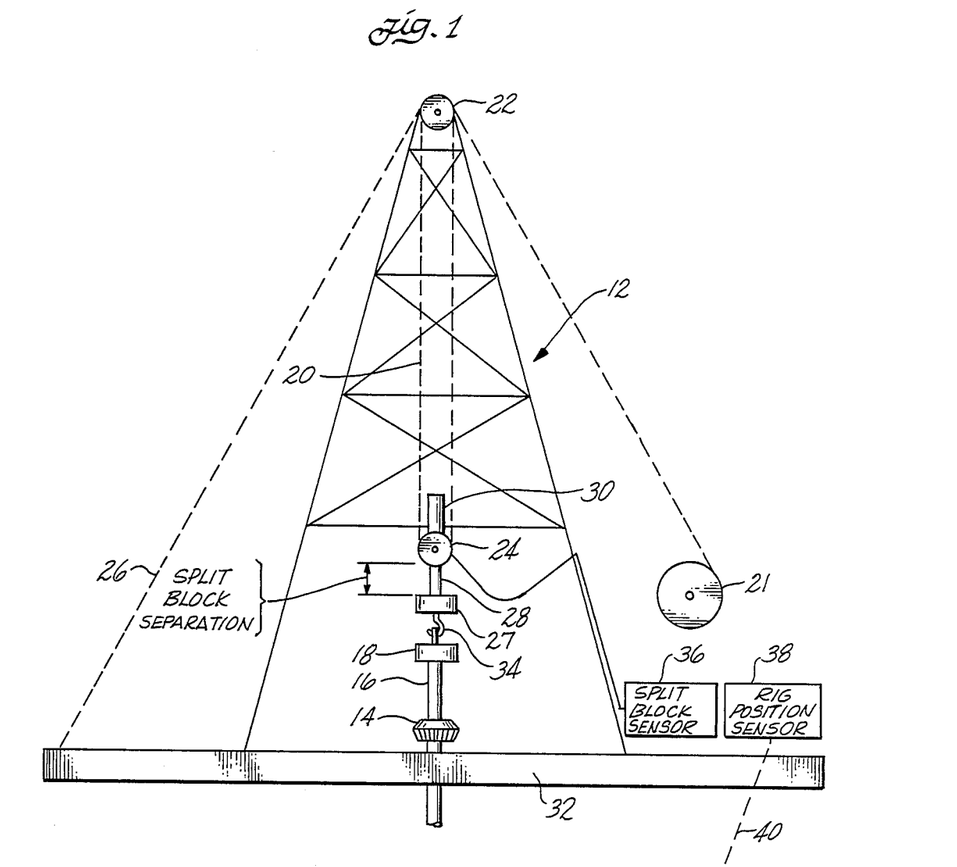
FIGS. 1, 2 and 3 illustrate a well drilling rig employing the present invention.

The basic features of the invention may be practiced on either an onshore or offshore floating rig. For simplicity, only the pertinent portions of an offshore floating rig are illustrated in FIG. 1. They include a derrick 12, rotary table 14, kelly 16, and swivel 18. The kelly 16 and drill string are moved upwardly or downwardly by a wire line 20 which is actuated by a drawworks 21. The wire line passes over the sheaves of a crown block 22 and corresponding sheaves of a traveling block 24, and it is anchored by a deadline 26.

For floating rigs the traveling block is normally split into a conventional traveling portion 24 and a lower yoke 27. The lower yoke 27 is movable upwardly or downwardly on a shaft 28 by a hydraulic cylinder 30 which is actuated to move the yoke 27 to accommodate for changes in height of the drilling deck 32 due to wave or tide action.

The swivel 18, kelly 16 and the drill string attached to the kelly are supported by a hook 34 on the yoke 27. It will be understood that for non-floating drilling rigs the yoke 27 is not used, and the hook 34 extends directly from the traveling block 24.

A split block sensor 36 provides an electrical signal which represents the split block separation which is the distance between the yoke 27 and the traveling block 24 as illustrated in FIG. 1.

A rig position sensor 38 provides an electrical signal which represents the movement of the rig deck 32 due to wave or tide action. The signal is derived from the guideline 40 which is anchored at the bottom of the water.

The rig position sensor 38 and the split block sensor 36 provide signals which are employed to produce a signal representing any error in the split block separation. These functions are described with reference to FIG. 5.

Figure 2:
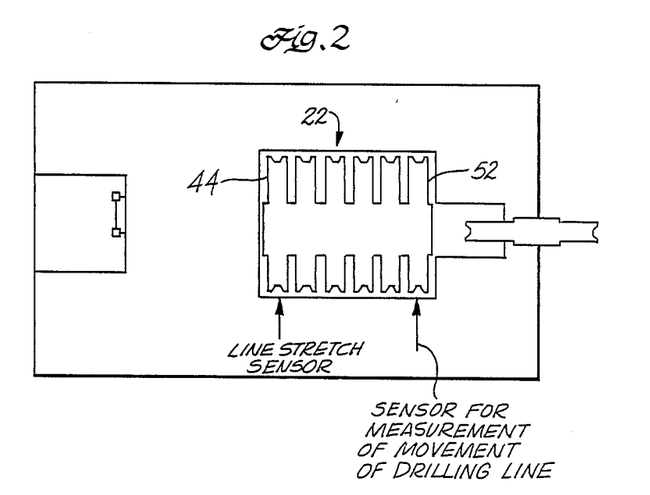
Figure 3:
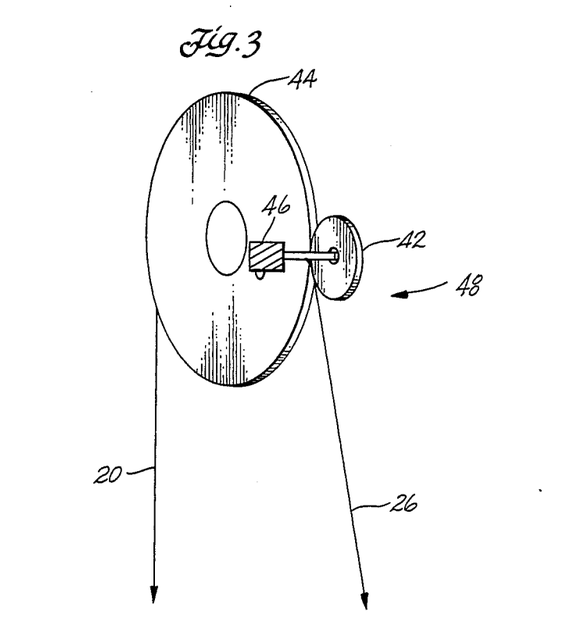

FIG. 2 is a plan view of the crown block 22, and FIG. 3 shows a shaft encoder wheel 42 which is in contact with the rim of the dead sheave 44 of the crown block. The encoder wheel 42 actuates a shaft encoder 46 which provides a signal representing any rotation of the dead sheave 44. The rotational movement of the dead sheave 44 is caused by deadline stretch. The encoder wheel 42 and the shaft encoder 46 constitute the line stretch sensor 48 of FIG. 4.

A sensor 50 for measurement of movement of the drilling line 20 serves to measure the movement of the drilling line 20 that passes over the sheave 52 of the crown block 22.

Although other means may be employed to measure the movement of the drilling line that passes over the sheave 52, preferably the sensor 50 is the type shown in our U.S. Pat. No. 4,338,565. It comprises three proximity sensors located adjacent the wire line which produce sine wave electrical signals representative of the movement of the spiral windings of the wire line.

Figure 4:
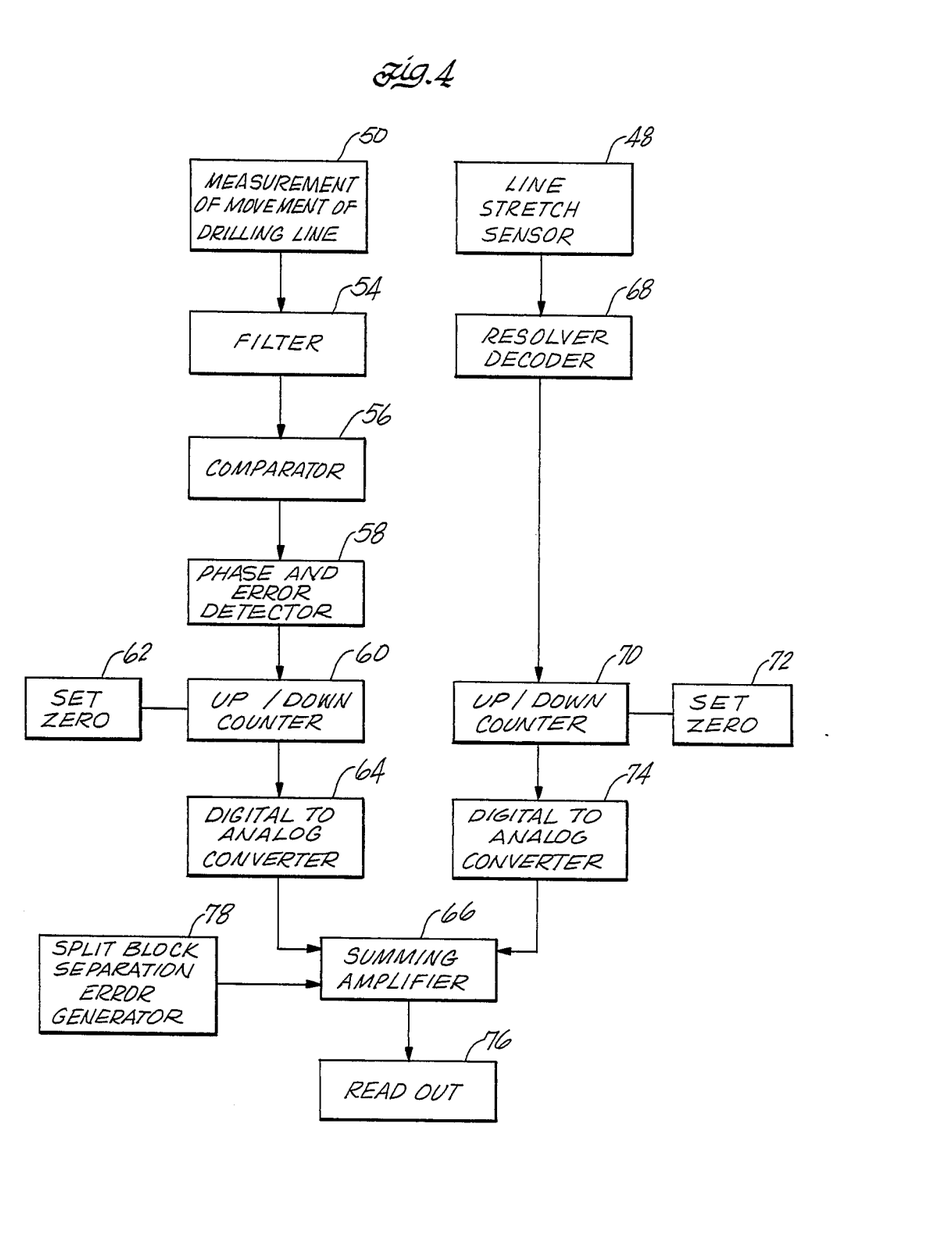
FIG. 4 is a block diagram of a circuit suitable for practicing this invention.

These signals are passed through a filter 54 which removes noise components to a comparator 56 which convert the sine wave signals to square wave signals. Those signals are applied to a phase and error detector 58 which constitutes a sequential logic circuit.

The output of the detector 58 is applied to an up/down counter 60 which produces a digital signal representing the direction an amount of movement of the wire line. It is provided with a zero set 62.

The output of the up/down counter 60 is applied through a digital-to-analog converter 64 to a summing amplifier 66.

A more detailed description of elements 50–66 for the measurement of movement of the drilling line is set forth in the aforesaid patent.

The output of line stretch sensor 48 is applied through a resolver decoder 68 to an up/down counter 70 having a set zero 72. The resolver decoder 68 produces a serial digital signal which represents the amount and direction of movement of the dead sheave 44.

The output of the up/down counter 70 is applied through a digital-to-analog converter 74 to the summing amplifier 66.

Thus, the summing amplifier 66 receives two analog signals. The signal from converter 64 represents the overall movement of the wire line 20, and the signal from converter 74 represents the stretch in the wire line 20. Correction of the overall movement of the wire line 20 for the wire line stretch provides an accurate measurement of equipment depth in a well.

A readout 76 provides a digital readout of equipment depth and of the traveling block position corrected for wire line stretch. The readout 76 may also provide an analog output for actuating a chart recorder.

Figure 5:
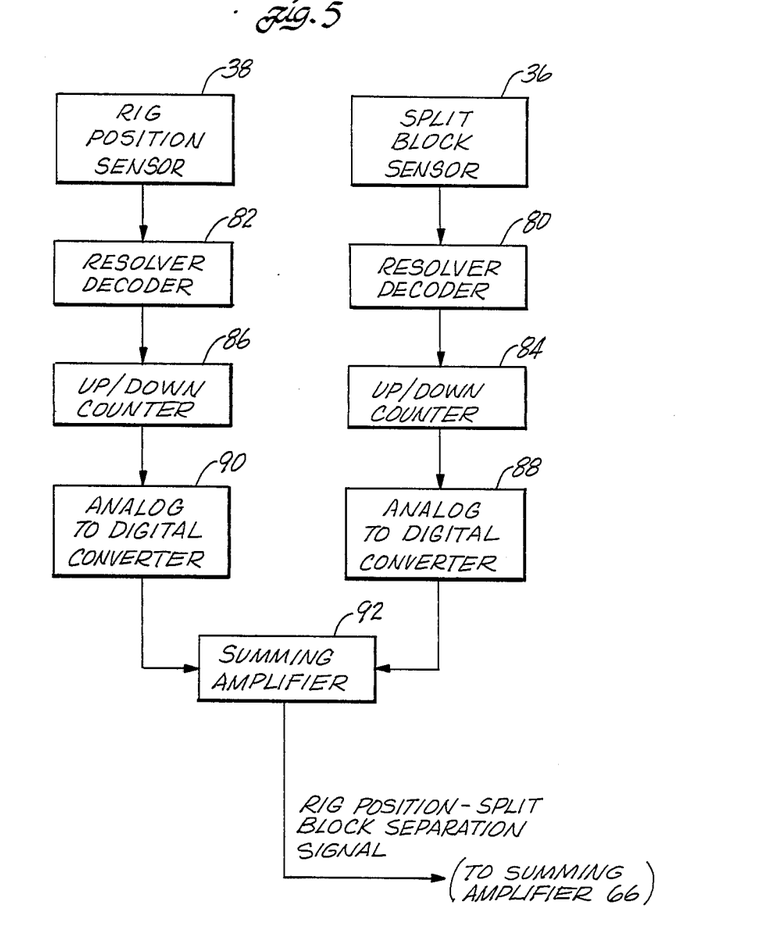
FIG. 5 is a block diagram of a circuit for providing a signal that represents the difference between the changes in rig position and the changes in split block separation.

For offshore floating rigs an additional correction may be provided for errors in measurement of the split block separation. This is provided by a split block separation error generator 78. The details of the error generator 78 are is shown in FIG. 5.

The split block sensor 36 is a shaft encoder or resolver arranged to provide an electrical signal which represents the split block separation. Such devices are produced commercially by Celesco Transducer Products, Inc. for example.

The rig position sensor 38 is a similar device which produces an electrical signal which represents the position of the drilling platform 32 as affected by wave and tide motion.

The outputs of the split block sensor 36 and the rig position sensor 38 are applied through resolver decoders 80, 82, up/down counters 84, 86, and analog-to-digital converters 88, 90, to a summing amplifier 92 which produces a signal representing the difference between the rig position signal and the split block separation signal. That error signal is applied to the summing amplifier 66 of FIG. 4 to correct for any errors in measurement of the split block separation.

Figure 6:
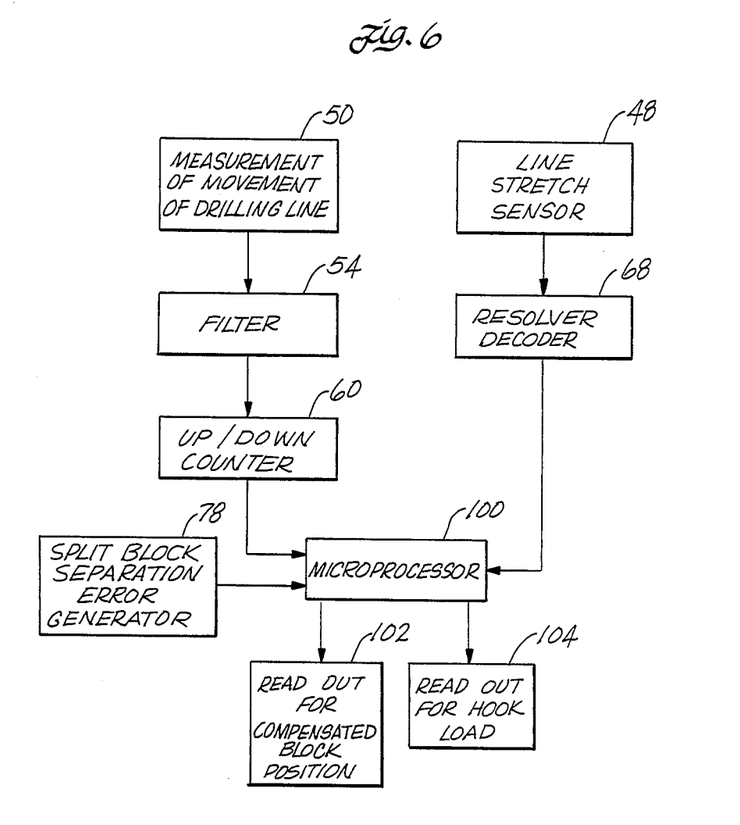
FIG. 6 is a block diagram showing how the invention may be practiced with a microprocessor.

FIG. 6 shows how the invention can be practiced with a microprocessor. The elements 48, 50, 54, 60, 68 and 78 are the same as those shown in FIG. 4.

The up/down counter 60 provides a digital signal representing movement of the wire line 20 to one input of the microprocessor 100. The resolver decoder 68 provides a digital signal representing the stretch of the line 20 to another input of the microprocessor. If desired, the output of a split block separation error generator 78 may also be applied to the microprocessor 100.

The microprocessor 100 is provided with a readout 102 for showing the compensated block position and equipment depth. This may comprise a digital readout and also an analog readout for driving a chart recorder.

The microprocessor may also be provided with a readout 104 for showing the hookload. This also may provide a digital readout and an analog output for driving a chart recorder.

Figure 7:
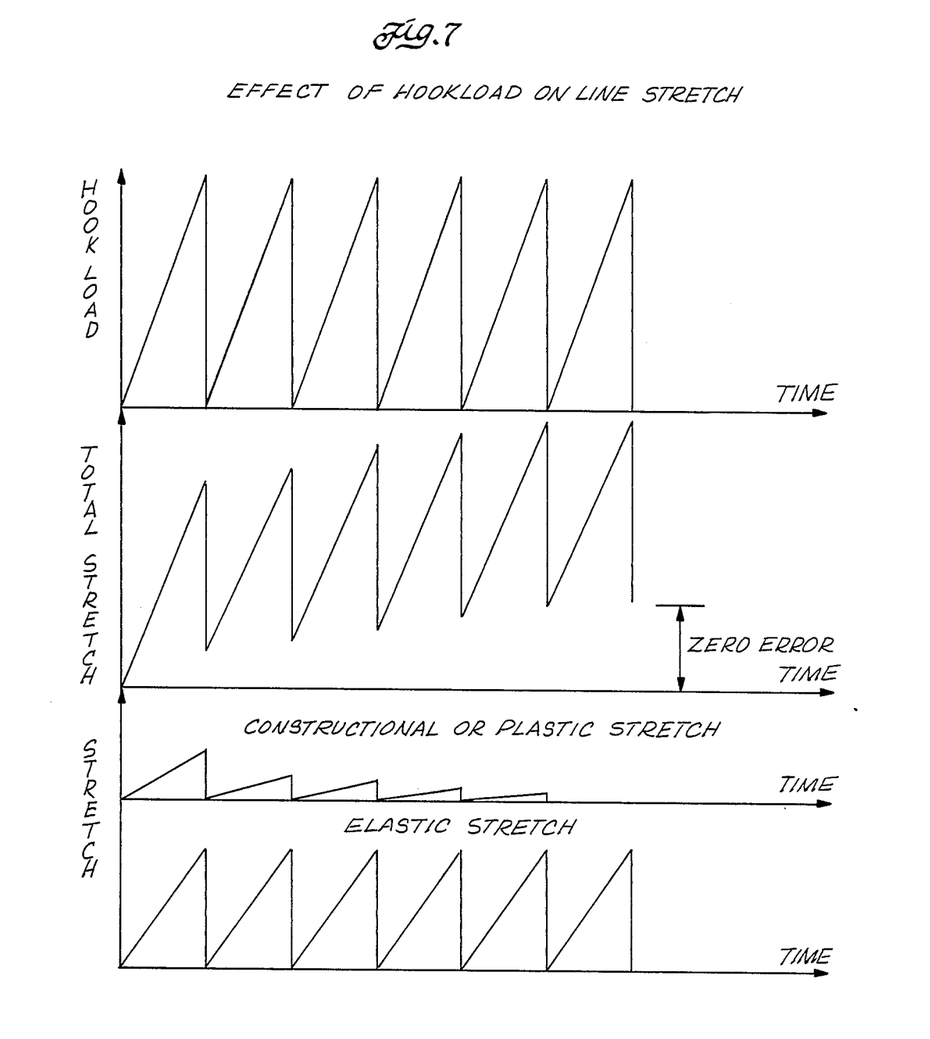
FIG. 7 is a chart showing the effect of hookload on line stretch.

FIG. 7 shows the effect of hookload on line stretch.

The apparatus of either FIG. 4 or FIG. 6 may be arranged or programmed to compensate for line stretch in accordance with the following equations:
Line stretch compensation equations (COMPENSATED BLOCK POSITION)=(APPARENT BLOCK POSITION)+[(TOTAL LINE STRETCH)/N]        (1)

(Where "N" is the total number of lines used to support the blocks.) Assume that all cable is "worked in" and is not subject to plastic stretch, except the deadline. Assume the deadline has plastic and elastic stretch associated with it.

(TOTAL LINE STRETCH) = (TOTAL ELASTIC STRETCH) + (DEADLINE PLASTIC STRETCH) (2)
\*\*Also\*\*
(TOTAL ELASTIC STRETCH) = (LINE TENSION) \* (LINE LENGTH)/ (CSA \* E)
Where "CSA" is the effective cross sectional area of the cable.
And "E" is the modulus of elongation for the cable.
And
(DEADLINE ELASTIC STRETCH) = (LINE TENSION) \* (DEADLINE LENGTH)/(CSA \* E)
THEREFOR
(TOTAL ELASTIC STRETCH)/(LINE LENGTH) = (DEADLINE ELASTIC STRETCH)/(DEADLINE LENGTH)
OR
(TOTAL ELASTIC STRETCH) = (LINE LENGTH) \* (DEADLINE ELASTIC STRETCH)/(DEADLINE LENGTH) (3)
From (2) & (3)
(TOTAL LINE STRETCH) = [(LINE LENGTH) \* (DEADLINE ELASTIC STRETCH)/(DEADLINE LENGTH) + (DEADLINE PLASTIC STRETCH)]
THEREFOR FROM (1)
(COMPENSATED BLOCK POSITION) = (APPARENT BLOCK POSITION) + [(LINE LENGTH) \* (DEADLINE ELASTIC STRETCH)/(DEADLINE

LENGTH) + (DEADLINE PLASTIC STRETCH)]/N

In the FIG. 4 embodiment the equipment depth is determined in the summing amplifier 66 by adding the total movement of the drilling line and the total line stretch in accordance with conventional summing circuitry. If plastic stretch is present, it may also be added.

The compensated block position is determined in the summing amplifier 66 by adding the apparent block position and the line length times the deadline elastic stretch divided by the deadline length and then dividing the result by the number lines supporting the traveling block.

Summing and division circuits are well known and hence they are not described in detail here.

In the FIG. 6 embodiments the equipment depth and compensated block position functions are performed in the microprocessor 100.

In addition to the basic equation it may be desirable to correct for a zero shift in deadline length due to plastic stretch. This is achieved by capturing the minimum value of line stretch during each operation, and correcting the "zero point". This is justified because it is always true that the hookload returns to the value of the blocks between consecutive hoisting operations.

The apparatus of FIG. 6 may be arranged or programmed to compensate for split block separation error by utilization of the signal from the split block separation error generator 78, as discussed with reference to FIG. 4.

Also, the apparatus of FIG. 6 may be programmed to measure the hookload in accordance with the following:

Determination of Hookload from Line Stretch

Line stretch due to variations in hookload is comprised of two components, "Elastic stretch" and "Plastic stretch". Plastic stretch is also referred to as "Constructional stretch".

Elastic stretch is the predominant part of the total stretch and is only a temporary condition which disappears when the line tension is reduced to zero. The stretch produced in this manner follows a linear relationship with applied load.

Plastic stretch is only significant when new "unworked" line is being used and soon disappears or becomes insignificant with use. Stretch produced in this way is permanent even after the line tension is reduced to zero.

In order to determine hookload from a measurement of line stretch it is necessary to determine what proportion of the two quantities exist at a specific moment in time. And to correct for the zero error produced by permanent stretching of the line. Once this is done, hookload can be easily obtained from the following equation;

Hookload=(Elastic Stretch)*(CSA)*(E)*(N)/(Line Length)

Where:
Elastic Stretch=Elastic Stretch measured in the "Deadline".
CSA=Cross sectional area of the "Deadline".
E=Modulus of Elasticity for the line.
N=Number of lines used to support the Traveling block.
Line Length=The length of the deadline.

To find out what portion of the stretch is plastic stretch, the following method is used:

For a simple system it will only be necessary to rezero the hookload calibration after new line has been worked in. For most practical use this will be quite sufficient as the error is likely to be very small.

The microcomputer may capture the value of the total stretch at short time intervals and store this information. Software in the microcomputer can determine the value of the total stretch when a minima is detected. A minima within preset limits will correspond to the new "zero point". This is true because during operations where a load is picked up and released the value of the Hookload returns to the same minimum value upon release of the load, i.e., on a drilling rig during a tripping operation the hook is used to pick up the drill string, then pull out a stand of pipe, the pipe is then disconnected and laid down. At this point the hookload value reaches a minimum value, which is the weight of the hook itself.

The microcomputer can in this way re-zero the hookload value automatically. In addition, the microcomputer can store how much the "zero point" was in error, and this will provide a measurement of how much plastic stretch took place. By plotting a normalized value of plastic stretch against successive operations, the microcomputer can predict exactly how much plastic stretch has taken place at any moment in time. This is true because the amount of plastic stretch will decay with successive operations in a predictable manner.

For simplicity the invention has been described with reference to measurements for a single drill pipe. It will be understood that successive measurements as drill pipes are added may be combined to provide a measurement of equipment depth for any number of drill pipes.

What is claimed is:

1. Apparatus for measuring the stretch of a wire line used in well drilling operations having an upper block with a plurality of sheaves and a traveling block having a plurality of sheaves, a wire line extending between the sheaves of the upper block and the sheaves of the traveling block, with one end of the wire line forming a deadline which extends from a fixed anchor over a rotatable dead sheave of the upper block comprising:
   (a) means coupled to the dead sheave of the upper block for measuring the rotation of the dead sheave to determine the amount of elastic stretch in the deadline; and
   (b) means for multiplying the length of the wire line by the ratio of the amount of elastic stretch in the deadline to the length of the deadline to provide a measurement of the elastic stretch of the wire line.

2. The apparatus of claim 1 further including means responsive to the measurement of the aforesaid ratio of the amount of elastic stretch in the deadline to the length of the deadline for multiplying said ratio by the cross-sectional area of the deadline times the Modulus of Elasticity for the wire line times the number of lines used to support the traveling block to provide measurement of the hookload on the traveling block.

3. Apparatus for measuring equipment depth in well drilling operations having an upper block with a plurality of sheaves and a traveling block having a plurality of sheaves, a wire line extending between the sheaves of the upper block and the sheaves of the traveling block, with one end of the wire line forming a deadline which extends from a fixed anchor over a dead sheave of the upper block comprising:
   (a) a first means for measuring the movement of the wire line in a direction along its longitudinal axis to determine the length of the wire which passes a referenced point;
   (b) second means coupled to the dead sheave of the upper block for measuring the rotation of the dead sheave to determine the amount of elastic stretch in the deadline between the fixed anchor and the dead sheave;
   (c) third means for multiplying the total length of the wire line by the ratio of the amount of elastic stretch in the deadline divided by the length of the deadline; and
   (d) fourth means for adding the measurements of the first and third means to show a corrected distance that the wireline has traveled from the referenced point.

4. The apparatus of claim 3 in which the traveling block is a split block, and further includes means for deriving a signal representing the difference between the rig position due to wave or tide action and the split block separation, and means for applying said signal to said fourth
   means to provide a correction in the measurement of equipment depth for any errors introduced by the split block separation.

5. In a method of measuring the stretch of a wire line used in well drilling operations having an upper block with a plurality of sheaves and a traveling block having a plurality of sheaves, a wire line extending between the sheaves of the upper block and the sheaves of the traveling block, with one end of the wire line forming a deadline which extends from a fixed anchor over a dead sheave of the upper block, the steps comprising:
   (a) measuring the entire amount of elastic stretch in the deadline between the fixed anchor and the dead sheave; and
   (b) multiplying the total length of the wire line by the ratio of the amount of elastic stretch in the deadline divided by the length of the deadline to provide a measurement of the elastic stretch of the wire line.

6. The method of claim 5 further including multiplying said ratio by the cross-sectional area of the deadline times the Modulus of Elasticity for the wire line times the number of lines used to support the traveling block to provide measurement of the hookload on the traveling block.

7. In a method for measuring equipment depth in well drilling operations having an upper block with a plurality of sheaves and a traveling block having a plurality of sheaves, a wire line extending between the sheaves of the upper block and the sheaves of the traveling block, with one end of the wire line forming a deadline which extends from a fixed anchor over a dead sheave of the upper block comprising:
   (a) measuring the movement of the wire line in a direction along its longitudinal axis to determine the length of the wire which passes a referenced point;
   (b) measuring the entire amount of elastic stretch in the deadline between the fixed anchor and the dead sheave;
   (c) multiplying the total length of the wire line by the ratio of the amount of elastic stretch in the deadline divided by the length of the deadline; and
   (d) adding the measurements of steps (a) and (c) to show a corrected distance that the wireline has traveled from the referenced point.

8. The method of claim 7 in which the traveling block is a split block, and further includes deriving a signal representing the difference between the rig position due to wave or tide action and the split block separation, and applying said signal to that produced by step (d) to provide a correction for any errors introduced by the split block separation.

* * * * *